United States Patent [19]

Stoll et al.

[11] Patent Number: 5,205,594
[45] Date of Patent: Apr. 27, 1993

[54] CONNECTING DEVICE FOR FLUID CONDUITS AND THE LIKE

[75] Inventors: Kurt Stoll, Esslingen; Herbert Köngeter, Reichenbach, both of Fed. Rep. of Germany

[73] Assignee: Festo KG, Esslingen, Fed. Rep. of Germany

[21] Appl. No.: 919,982

[22] Filed: Jul. 27, 1992

Related U.S. Application Data

[63] Continuation of Ser. No. 648,221, Jan. 31, 1991, abandoned.

[30] Foreign Application Priority Data

Mar. 7, 1990 [DE] Fed. Rep. of Germany ....... 4007101

[51] Int. Cl.$^5$ ............................................. F16L 17/00
[52] U.S. Cl. ..................................... 285/322; 285/323
[58] Field of Search ................... 285/33, 34, 322, 323, 285/382.7, 243

[56] References Cited

U.S. PATENT DOCUMENTS

| | | | |
|---|---|---|---|
| 3,653,689 | 4/1972 | Sapy et al. | 285/322 |
| 3,743,326 | 7/1973 | Courtot et al. | 285/323 |
| 3,909,046 | 9/1975 | Legris | 285/323 |
| 3,999,783 | 12/1976 | Legris | 285/323 |
| 4,045,055 | 8/1977 | Blakely | 285/322 |
| 4,083,586 | 4/1978 | Helm | 285/323 |

FOREIGN PATENT DOCUMENTS 669442 3/1989 Switzerland ...................... 285/322

*Primary Examiner*—Eric K. Nicholson
*Attorney, Agent, or Firm*—Flynn, Thiel, Boutell & Tanis

[57] ABSTRACT

A connection device for fluid conduits. An annular gripper member is arranged in a housing and has an axially sliding actuating part, on which a plurality of clamping elements are provided and between the clamping elements and the actuating part there are bending regions which allow rocking of the clamping elements. Each clamping element has a radially projecting pressing part which axially opposes a support surface on the housing. If a conduit is to be released which is held in the annular gripper member, an external thrust is exerted on the annular gripper member to cause the clamping elements to be rocked into a releasing position relative to the conduit.

14 Claims, 2 Drawing Sheets

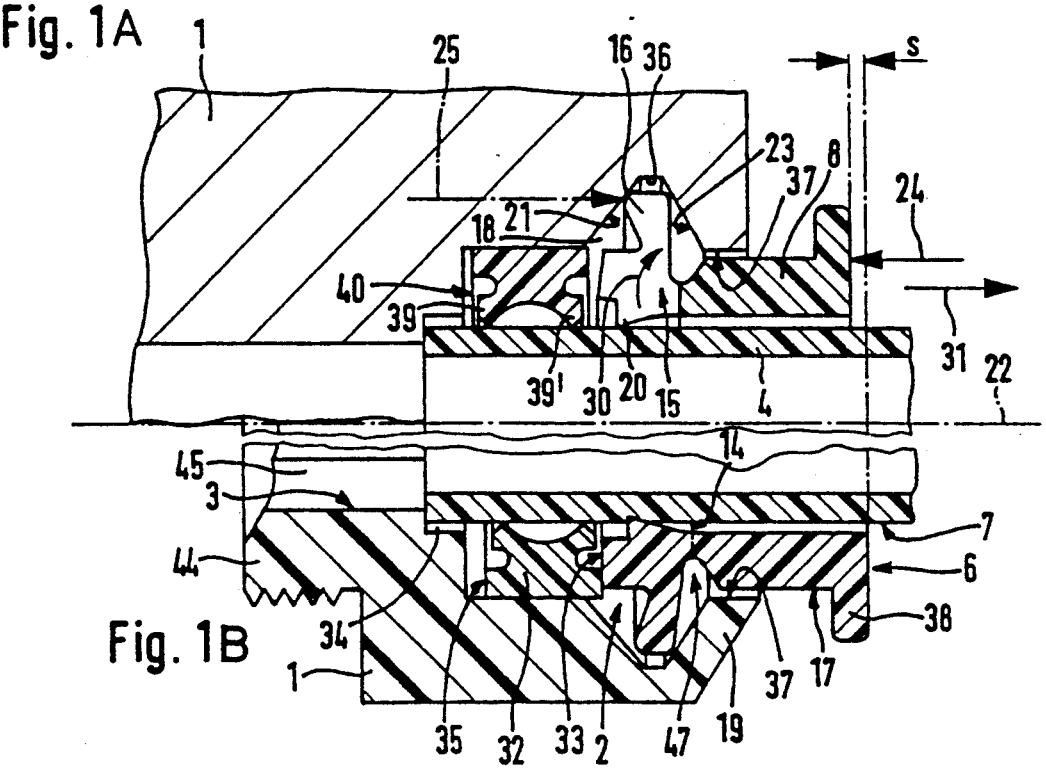
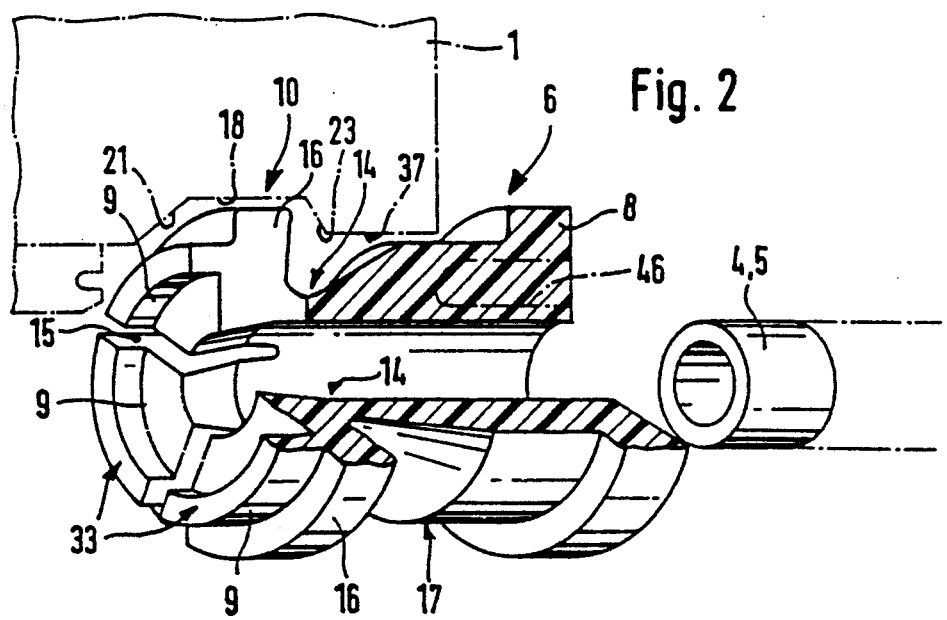

CONNECTING DEVICE FOR FLUID CONDUITS AND THE LIKE

This application is a continuation of U.S. Ser. No. 07/648,221, filed Jan. 31, 1991 now abandoned.

FIELD OF THE INVENTION

The invention relates to a connecting device for fluid power lines/fluid pipes or conduits and the like, comprising a housing which has a recess into which the connection end of a fluid pipe or the like may be inserted, and an annular gripper means for detachably securing the fluid pipe in relation to the housing.

BACKGROUND OF THE INVENTION

Such a connecting device is for instance described in the European patent 0 193 271. In this respect it is a disadvantage that the device is comparatively elaborate to manufacture and to fit. Furthermore, for releasing a connection made it is necessary to have an additional separate component. The present invention has as one of its aims the certain of a connecting device which on the one hand has only a small number of parts and on the other hand is simple to produce and to handle.

SHORT SUMMARY OF THE PRESENT INVENTION

Accordingly one object of the invention is to provide a connection fitting meeting these requirements.

In accordance with the invention the gripper means is provided with an axially sliding annular or sleeve-like actuating part, on whose side, which is turned towards the interior of the recess in the housing there is a plurality of clamping elements, which are arranged consecutively in the circumferential direction and in a clamping position are in cooperation with the circumferential face of the inserted connection end and which are connected with the actuating part via a bending means and a respective clamping element possesses a pressing part, which is arranged radially at least partly further to the outside than the bending means and axially internally is opposite to a support face of the housing in such a manner that when the actuating part is slid inwards in the release direction the pressing parts are in cooperation with the support face so that the clamping elements are rocked about the part with the associated bending means radially outwards into a release position, in which they allow the removal of the previously clamped connection end.

The result is therefore a connection device, in which the gripper means combines the functions of clamping and releasing. The clamping elements may advantageously be designed integrally with an actuating part so that the gripper means constitutes a single component which is simple to produce and is easy to fit without any trouble. In the position of use the gripper means is held on the housing in such a manner that the pressing parts are opposite to the support face which is axially fixed in relation to the housing and the connection end may be inserted into the adjoining clamping part, which is constituted by the clamping elements. In this respect the clamping elements conveniently open out slightly and owing to the inherent elasticity present at of the bending means bear against the outer circumferential surface of the connection end. In order to release the clamping effect so produced a thrust is exerted externally on the actuating part in such a manner that the same is displaced inwards axially in relation to the recess of the housing. In this respect the clamping elements are rocked outwards owing to the cooperation of their pressing parts with the support face about the part with the bending means and owing to the further spreading and opening out so produced make possible the withdrawal of the connection end of the previously clamped fluid power pressure line. Herein the term "fluid power line" is to be construed widely and means for instance flexible hose and the like as well.

The clamping means is preferably an integral or unitary component made of synthetic resin. The support face cooperating with the pressing parts preferably has an oblique and more particularly straight configuration so that in the direction of release there is a reduction in cross section corresponding to a conical form. This facilitates the slipping off of the pressing parts during the release operation.

When an abutment face is opposite to the support face so that the pressing part is received between them, and there is a loading of the gripper means in a direction opposite to the direction of release, such loading being due for instance to tugging on the clamped fluid power line, there will be an increase in the clamping action. The clamping elements will in addition be pressed inwards radially, the bending means making possible the corresponding slight pivoting movement. Preferably the abutment surface is constituted by an oblique surface, albeit with a direction of conical taper opposite to that of the support surface.

Preferably the two surfaces are part of a retaining recess of the housing, in which the pressing parts are at least partly arranged and ensure permanent linking of the clamping means with the rest of the structure.

An additional sliding guiding action with respect to the clamping means and particularly in the vicinity of its actuating part prevents skewing and more particularly in the case of pulsating loads-relative transverse movement between the clamping elements secured to the housing and the actuating part so that the bending means are hardly subjected to any loading effects.

The enhanced clamping effect on the basis of the support surface may be produce also by the use of an additional pressing element, which is opposite to the clamping means in the housing recess axially and internally and is able to be axially slid. When the fluid conduit or, respectively, the duct in the housing adjoining the recess in the housing is put under pressure, the pressing element is displaced towards the gripper means by the fluid pressure and will press against the support faces on the associated side of the clamping elements so that the pressing parts will be in cooperation with the support face. The pressing element is preferably a sealing ring, which more particularly is in the form of a dual lip sealing ring and provides a sealing effect both in the case of operation under pressure and under vacuum.

It is an advantage if the connection device is designed in the form of a connection fitting, the housing then forming an independent component, which may be secured at any desired position or has further possibilities for connection for fluid power lines. Furthermore, the housing may be a part of the housing of a piece of equipment as well, for instance in the form of a value housing or a cylinder barrel, in which the housing recess is provided. In the case of design as an independent connection fitting the recess of the housing or the adjoining duct in the housing is preferably provided with a suitable shape for cooperation with a screwdriver, i.e.

a torque tool socket, so that such a shape is not necessary on the outside, this reducing the overall radial size.

BRIEF DESCRIPTION OF THE DRAWINGS

The invention will now be described in more detail with reference to the accompanying drawings, which show several working embodiments thereof.

FIG. 1A shows a first embodiment of the connection device in longitudinal section;

FIG. 1B shows a second embodiment of the connection device in longitudinal section;

FIG. 2 shows a similar clamping means designed like the clamping means of FIG. 1 in perspective and partly broken away view, the housing only being illustrated diagrammatically; and FIG. 3 to FIG. 5 shows a modified form of the invention in different views.

DETAILED ACCOUNT OF WORKING EMBODIMENTS OF THE INVENTION

Figure 3:
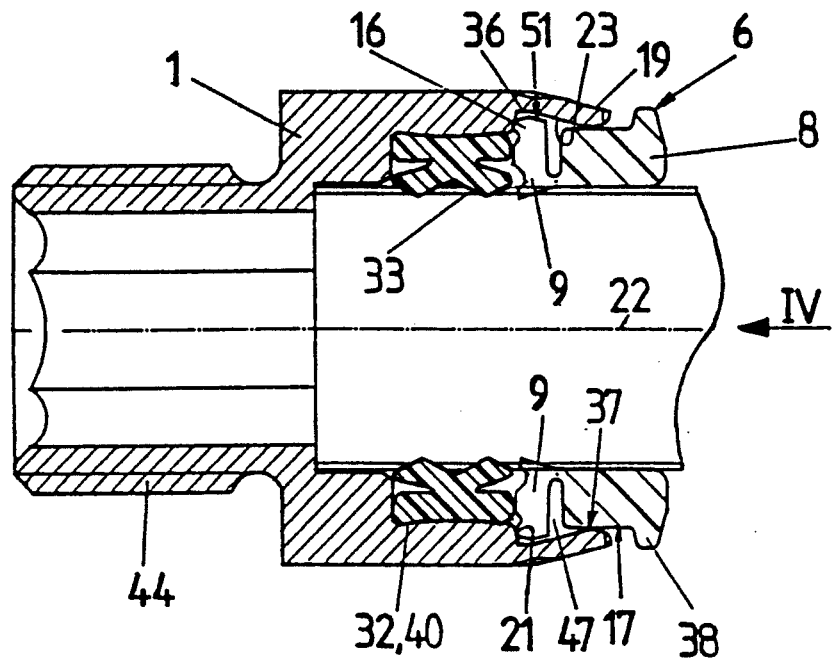

The connection device comprises a housing 1, which has a recess 2 therein adjoined by a duct or port 3 in the housing for connection with other fluid power means/fluid pipes or conduits. Into the recess 2 in the housing the connection end 4 or spigot of a fluid conduit 5 may be inserted in order to produce a connection with some other piece of equipment. The fluid conduit may consist of metal and more particularly synthetic resin and is for instance in the form of hose. It is in this manner that the conduit is put in communication with the duct 3 in the housing and fluid under pressure or vacuum is able to flow therethrough.

The releasable attachment of the fluid conduit 5 in relation to the housing 1 is ensured by means of an annular gripper means 6, which is held in place in the vicinity of the recess 2 in the housing and more particularly in the same, the arrangement being preferably coaxial in relation to the recess 2 in the housing 2. A connection end 4, which in the position of use extends into the recess 2 of the housing is thus surrounded in the vicinity of its external circumferential surface 7 by the gripper means 6.

The gripper means 6 is designed with an annular or sleeve-like actuating part 8, which if necessary may be provided with slots. On its side turned towards the interior of the housing recess 2, that is to say on the side directed axially into the interior of the recess 2 in the housing, there is a plurality of clamping elements 9, as may be best seen in FIG. 2. These clamping elements constitute the clamping part 10 of the gripper means 6, since they are arranged consecutively in the circumferential direction in relation to the recess 2 in the housing or to the actuating part 8. In the illustrated working embodiment there are four such clamping elements 9, which are designed in the form of segments, but if necessary there may be a different number thereof, as for instance six of them. Each clamping element 9 is connected with the actuating 8 via a bending means or bending part 14 in such a manner that they may be rocked independently from each other to a certain extent. Dependent on the degree of rocking there is a larger or smaller opening out thereof with a correspondingly different cross section of the clamping part surrounded by the clamping elements 9. In order to separate the individual clamping elements 9 from each other there are preferably slots 15 between the adjacent clamping elements 9, such slots preferably extending as far as the bending means 14. More particularly, they extend in planes which run simultaneously in axial and radial directions.

Preferably the gripper means is constituted by an integral component, in the case of which the clamping elements 9 are molded on the actuating part 8. As a particularly low price design the part may be produced as a synthetic resin injection molding. In the illustrated working embodiment the bending means are in the form of rib-like parts with a reduced thickness of their material in the radial direction.

Each clamping element 8 has a pressing part 16, which at least partly is arranged further to the outside than the associated bending means 14. In the illustrated working embodiment the pressing parts 16 are constituted by projections extending radially outwards, of the clamping elements 9, which extend preferably in the circumferential direction along the respective clamping element 9. The pressing parts 16 furthermore extend radially over the outer face 17 of the part, which adjoins the bending means 14, of the actuating part 8.

In order to permanently link the gripper means 6 to the housing 1 the clamping part 10 has its pressing parts 16 received in a retaining recess 18, which is more particularly annular and which is machined in the inner circumferential face of the recess 2 in the housing. The retaining recess 18 may adjoin the housing recess 2 externally as an axial prolongation. It is produced for instance by machining directly after molding the housing 1 or by inwardly crimping over a cylindrical edge part 19 on the circumferential part of the recess 2 of the housing.

In order to fit the griper means 6 in place before the insertion of a connection end 4, the clamping elements 9 are rocked radially inwards about the bending means 14 so that the clamping part 10 is able to be inserted into the recess 2 of the housing, and when the axial position corresponding to retaining recess 18 is reached, the clamping elements 9 bend over outwards into the above noted basic position owing to the elastic bending attachment, the pressing parts 16 then assuming positions within the retaining recess 18.

In this basic position the cross sectional area internally delimited by the clamping part 10 is preferably somewhat smaller than the external cross sectional area of a connection end 4 which is to be fitted. Therefore the clamping elements 9 are slightly opened out when a connection end 4 is inserted so that they bear against the outer circumferential face 7 with a certain biasing action. Owing to the tendency to return elastically into the basic position a clamping position is reached as a result. In order to improve the clamping engagement it is possible for the clamping elements 9 to be provided with one or more tooth-like projections 20 in the part cooperating with the respective connection end 4.

The pressing parts 16 are internally axially opposite to a support faces 21, which in the illustrated working embodiment is constituted by the further inward side face of the retaining recess 18. It is fixed to the housing so that it is unable to move axially. Herein references to an axial direction are to be understood as references to the recess 2 in the housing and the longitudinal axis 22 thereof, and, respectively, to the gripper means held therein.

Axially to the outside the pressing parts 16 are furthermore preferably opposite to an abutment surface 23, which in the illustrated working embodiment is constituted by the outer side face of the recess. Therefore the two faces 21 and 23 are opposite to each other with an axial distance between them and the pressing parts 16 are located in the intermediate zone.

The holding function of the abutment 23 in relation to permanently linking the gripper 6 means with the rest of the device may be ensured in a different manner in the case of a further working embodiment, which is not illustrated. In the illustrated working embodiment the abutment surface 23 however has a special function to be described in more detail infra which makes its presence seem advantageous so that it is convenient to integrate the retaining function in it as well.

If an inserted connection end 4 held in the clamping part 10 is to be removed, it is only necessary now to apply a small thrust in the direction of release as indicated by the arrow 24 from the outside axially against the actuating part 8. The same is thus slid in the longitudinal direction 22 towards the interior of the housing recess 2 in such a manner that the pressing parts 16 are pressed against the support surface 21. Owing to opposite force acting in this case on the pressing parts 16, as indicated in broken lines at 25, the pressing parts 16 perform a small rocking movement as indicated by the arrow 30 about the part of the respectively associated bending means 14. Owing to this the clamping elements 9 move away in the radial direction from the connection end 4 until the same may be withdrawn owing to the reduced or interrupted clamping engagement. When the connection end is removed and when the thrust force 24 is interrupted the gripper means 6 will preferably move back automatically into the above noted basic position, under the effect of the elasticity of the attachment of the clamping elements 9 via the bending means 14 on the actuating part 8 and the support of the pressing parts 16 on the support face 21, the actuating part then being pushed back again.

When there is a displacement in the release direction the pressing parts 16 preferably slide at least to a slight extent on the support face 21. In order to facilitate the movement it is therefore advantageous if at least in its part cooperating with the respective pressing part 16, the support face 21 has an oblique setting. This is the case in the illustrated working embodiment, in which the part of the surface placed further to the outside is arranged further in the recess 2 of the housing than the part which is radially further to the outside. The cross sectional area delimited by the annular support surface 21 therefore diminishes in the direction of release as indicated by the arrow 24. As seen in the longitudinal section of FIG. 1 there is a linear configuration of the support surface 21, although if necessary a certain curved configuration is possible.

Furthermore the abutment surface 23 is preferably designed in the form of an annular oblique surface, the delimited cross section diminishing in a direction opposite to the release direction 24, that is to say in the clamping direction 31. It will be clear that the annular surfaces 21 and 23 may if necessary have local circumferential interruptions if appropriate.

Looked at generally the two surfaces 21 and 23 therefore define a recess or depression 18 whose side walls generally conform to a V-like configuration when viewed in the section in accordance with FIGS. 1A and 1B.

The advantage already noted of the abutment surface 23 is that when there is a pull in the clamping direction 31 acting on the connection end 4 it causes an increase in the clamping effect. For in the case of such a load the gripper means 6 will be moved outwards in a corresponding manner while producing the clamping engagement between the connection end 4 and the clamping part 10 so that the pressing parts 16 will bear on the abutment surface 23. The result of this is in turn that the clamping elements 9 are pressed or bent radially inwards in a direction opposite to the direction of the arrow 30 in such a manner that the pressing force on the outer circumferential face 7 is enhanced.

The same effect is advantageously also produced if the duct 3 in the housing or the duct in the line is made subject to internal pressure. For this purpose axially within the clamping part 10 a sealing ring 32 is arranged in the recess in the housing 2 so that it may slide axially. Opposite to this sealing ring 32 there are support surfaces 33 provided on the clamping elements 9. Such surfaces are preferably approximately in the radial part between the bending means 14 and the pressing parts 16. The sealing ring 32 coaxially encompasses an inserted connection end 4 like the gripper means 6. If the arrangement is now subjected to internal pressure the fluid will be able to act through the intermediate spaces 34 present between the end part of the fluid power line 5 and the housing recess 2 and pressurize the sealing ring 32 on the axial side 35 turned away from the gripper means 6. Owing to this the sealing ring 32 is moved towards the gripper means 6 and will press against the support surfaces 33 in such a manner that the gripper means will be moved a small distance and finally the pressing parts 16 will bear against the abutment surface 23 with above noted consequence of an inward rocking of the clamping elements 9. With an increase in the internal pressure and the clamping force on the connection end 4 will therefore be enhanced. The corresponding position of the sealing ring 32 and of the gripper means 6 is illustrated in the lower part of FIG. 1.

The design is preferably such that at least in the basic position of the clamping elememts 9 the pressing parts 16 are arranged with room for axial movement between the support surface 21 and the abutment surface 23. This precludes jamming and favors slight pivoting of the pressures parts 16. In particular for the same reason the design is preferably such that radial play is allowed for between the individual pressing parts 16 and the radially opposite floor 36 of the retaining recess 18.

The allowance of play between the pressing parts 16 furthermore leads to free adaptation of the position of the clamping elements to suit the respective outer diameter of the respective inserted connection end. Therefore there is an automatic, free allowance for inaccuracies of manufacture.

As shown in FIGS. 1A and 1B there is the distance s as the displacement along which the actuating part 8 is to be moved as indicated by the arrow 24 in order to move out of the clamping position into the release position explained above.

In order to keep the load on the bending mean 14 to a minimum when the pressure line 5 is connected, the actuating part 8 is preferably supported on the housing in a direction which is transverse in relation to the longitudinal axis 22. In order to make this possible the part 8 is guided for sliding movement by having its outer face running on the housing 1. In the illustrated working embodiment a section, which adjoins the retaining depression 18 is axially to the outside, of the inner surface of the housing recess 2 constitutes guide surface 37, which encompasses a part of the length of the outer surface 17 with a running fit between them.

It will be seen from FIGS. 1A and 1B that outside the recess 2 of the housing the actuating part 8 may be provided with a additional actuating means 38, for instance in the form of a flange-like radial projection.

Again with respect to the sealing ring 32 it is to be noted that the same is preferably in the form of a sealing ring with two lips as shown in FIGS. 1A and 1B. There are two axially offset cooperating sealing lips 39 and 39', which are both in cooperation with the circumferential surface of the connection end 4. The inner sealing lip 39 functions to provide a sealing action when internal pressure is acting. The outer sealing lip 39' precludes a penetration of air from the outside if the duct 3 in the housing is under vacuum. In this manner the connection device may be used as a general purpose fitting without special adaption. Because the sealing lips 39 and 39' are able to give way in the radial direction there is furthermore an automatic adaption to the respective cross section of the line. Both the sealing lips are arranged on a basic body and conveniently extend from it inwards and simultaneously towards the respectively associated axial end or side so that there is an oblique configuration which in cross section is approximately U-like or V-like.

In the part where there is cooperation with the support surface 33 it is possible if necessary to provide means on the sealing ring for reducing wear, as for instance a hard coating. Furthermore, it is possible not to have the sealing ring itself as the pressing element 40 directly acting on the support surface 33, but rather a separate element (not illustrated) between the same and the gripper means 6.

In FIG. 1B, the housing 1 is so designed that the connection device is in the form of self-contained connection fitting or member, which may be attached to any desired component, for instance a receiver. Therefore the side, which is opposite to the recess 2 in the housing, has a threaded member, more particularly in the form of a threaded spout 44 on it, which has the duct 3 of the housing extending through it and may be screwed in place. It is clear that in place of the threaded part 44 it would also be possible to have different connection means and furthermore it is possible to provide here or at some other point on the housing 1 further facilities, which would make possible the connection of a further connection spigot 4.

If the connection means are in the form of a threaded member 44 it is convenient to provide a torque tool socket, more particularly with a polygonal form in the recess 2 in the housing 2 or, as illustrated here, in the adjacent part of the housing duct 3, in order to receive a screwing tool, for instance in the form of an allen key. The screwing tool may in this case be inserted through the recess 2 in the housing. There is more particularly the advantage that no steps have to be taken on the housing 1 externally for screwing, this leading to a compact radial overall size.

In FIG. 1A an alterative form of housing 1 is illustrated which is part of a larger equipment housing, as for instance part of a valve housing. The structure of the connection device thus makes it possible to provide a housing recess 2 of the type mentioned on any desired equipment housing so that only the gripper means 6 has to be inserted therein in order to have the connection means. It is therefore possible to dispense with a seperating housing 1, and the only part which has to be manufactured is the gripper means 6.

The pressing parts 16 may be made in the form of beads or moldings with a constant cross section. The bending means 14 constitute a sort of joint. The guiding contact between the housing 1 and the actuating part 8 leads not only to the above noted advantages but also to automatic centering. The support surface 21 and the abutment surface 23 may be constituted by a plurality of surface sections arranged consecutively in the circumferential direction. The pressing parts 16 may be chamfered in the contact zone with the support surface 21 and more particularly with the abutment surface 23, such a chamfer preferably having an angle of approximately 15°, as measured in the basic position. In order to reduce weight it is possible for the actuating part 8 to be provided with a circumferential recess 46 which is marked in broken lines. It is particularly convenient if the bending means 14 are provided in the radially inner part of the gripper means 6, as is indicated in the illustrated working embodiments. Any weakening of the material necessary is in this case provided for instance in the form of a circumferential recess 47 in the radially opposite outer part, which also ensures trouble-free rocking back of the clamping elements 9. The support surfaces 33 are more particularly located on the axially inwardly directed side of the clamping elements.

Figure 4:
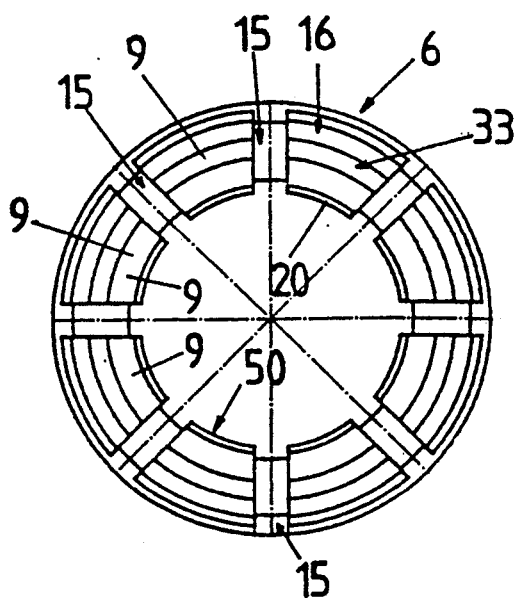
Figure 5:
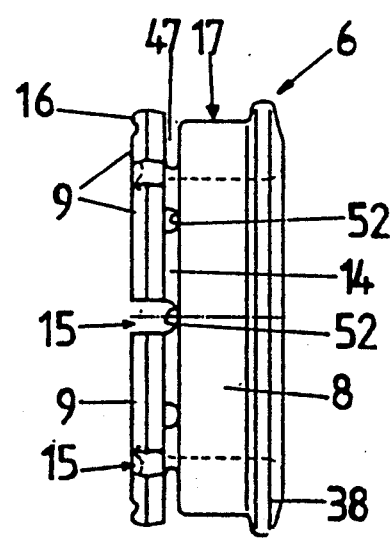

The FIGS. 3 through 5 show a connection device in the form of a connection fitting, FIG. 3 being a longitudinal section, in FIG. 4 being a front view as indicated by the arrow in FIG. 3 axially of the gripper means 6 and FIG. 5 being a side view of the gripper means 6 without the housing and looking in the radial direction. Since the principle of the operation of this modified form of the invention is the same as in FIGS. 1 and 2 and there are only some modifications in detail, the description so far will also relate to this further working embodiment so That like parts are denoted by like reference characters.

The gripper means in accordance with the working embodiment of the FIGS. 3 through 5 has eight clamping elements 9, which are to be seen more particularly in FIG. 4. They are separated from each other by slots 15 so that their mobility in relation to each other in the radial direction is not obstructed when moving between the individual positions. The number of the clamping elements 9 will be dependent on the clamping opening to be delimited by them.

While in the case of the working embodiment in accordance with FIGS. 1 and 2 the slope as seen in longitudinal section, of the support surface 21 and the abutment surface 23 is generally equal in relation to the longitudinal axis 22, in the modified working embodiment in accordance with FIGS. 3 through 5 the slope of the support surface 21 is considerably steeper than that of the abutment surface 23. In the part adjacent to the abutment surface 23 the pressing parts 16 preferably are made oblique part and their surface is approximately parallel to the facing opposite abutment surface 23 and is more particularly parallel the same in the basic position. The outline as seen in FIG. 3 of the abutment surface 23 rises slightly from the axially outer part to the axially inner part in order, in the part with the maximum distance from the longitudinal axis 22, to preferably merge with a cylindrical part, which constitutes the floor 36 and has a short axial length and which is adjoined by the support surface 21 with a rapidly decreasing distance from the longitudinal axis 22 and therefore with a greater slope than the abutment surface 23. As seen in the basic position that part of the pressing part 16, which comes into engagement with the support surface 21, is preferably located generally on a common radial plane with the support surface 33, which are provided radially somewhat further inwards on the axial side facing away from the actuating part 8, of the clamping elements 9.

The internal diameter delimited by the actuating part 8, is preferably sized to correspond to the connection end to be inserted and is more particularly somewhat larger so that there is some play left. In order to steady the radial position the actuating part 8 in addition has its outer face 17 bearing on the guide surface 37 to allow axial sliding, such guide face 23 axially externally adjoining the abutment surface 23 and being provided in the illustrated working embodiment radially inwards in the vicinity of the free end of an annular edge 19 of the housing. This edge 19 is in the illustrated working embodiment initially in the form of a molded tubular ring and it is then bent radially inwards into the position indicated so that the circumferential surface of the edge adjoining the guide surface or the guide part 37 axially internally, preferably simultaneously forms the abutment surface 23. It is also possible for the edge 19 to be provided during manufacture directly in the desired configuration. It may also be slotted along its circumference at least once and preferably a plurality of times so as to be generally similar to the arrangement of the clamping element 9.

It is particularly suitable to provide for free pivoting of the clamping elements 9 if the axial depth of the slots 15 extends as far as to start of the actuating part 8 so that the bending means 14 are produced in the part radially within the depression 47 and the bending means 14, which belong to the clamping elements 9 adjacent in the circumferential direction, thus are also separated in the circumferential direction by the end parts 52 of the slots 15.

The embodiments of the invention in which an exclusive property or privilege is claimed are defined as follows:

1. A connection device for use in facilitating a connection of a fluid conduit to a housing means having means defining a recess adapted to receive a connection end of the fluid conduit therein, comprising a unitary annular gripper means encircling the conduit and adapted to be axially slidably received into the recess for effecting a detachable securement of the connection end of the fluid conduit in the recess when the annular gripper means is a first position in the recess, wherein the unitary annular gripper means is provided with an annular actuating part having on an axial end facing an interior of the recess a plurality of circumferentially spaced clamping elements, bending means on the annular gripper means for supporting the clamping elements thereon for movement between a radially inwardly clamping position and a radially outwardly release position and for forcibly yieldably urging the clamping elements radially inwardly so as to engage an outer surface of the connection end when the connection end is inserted into the recess, the clamping elements, when so engaged by the connection end, being urged radially outwardly slightly due to a difference in circumferential dimension between an outer circumference of the connection end and an inner circumference of the clamping elements, a respective clamping element each having a pressing part arranged radially outwardly from the bending means and axially offset to the bending means, each said pressing part being received in a groove-like retaining recess in an inner circumferential surface of the recess of the housing means, the retaining recess having an axially inwardly located side face facing axially outwardly of the recess in the housing means and an axially outwardly located side face spaced axially outwardly of the recess in the housing means therefrom and opposing the inward side face, the pressing parts being located in an intermediate region between the axially inward side face and the axially outward side face, the axially inward side face of the retaining recess defining a support surface having an oblique configuration, the radially outer portion of the support surface being arranged axially closer to the outer end of the recess in the housing means than the radially inner portion of the support surface, the support surface axially opposing the pressing parts in such a manner that when the actuating part is slid axially further into the recess to a second position thereof in a effort to effect a release of the connection end, the pressing parts operatively engage the obliqued support surface and cause the clamping elements to be rocked about the bending means radially outwardly into the release position to allow for the removal of the clamped connection end from the recess in the housing means.

2. The connection device as claimed in claim 1, wherein the axially outward side face of the retaining recess axially opposite to the support surface defines an abutment surface having an oblique configuration, wherein a radially inner portion of the abutment surface is arranged axially closer to the axially outer end of the recess in the housing means than the radially outer portion of the abutment surface, so that a thrust applied axially to the annular gripper means and in a direction tending to move the gripper means axially out of the recess will cause the clamping elements to be urged radially inwardly about the bending means and against the outer surface of the connection end owing to an engagement of the pressing parts with the abutment surface.

3. The connection device as claimed in claim 1, wherein the gripper means is an integral component made of synthetic resin.

4. The connection device as claimed in claim 1, wherein the pressing parts are arranged with axial play between the support surface and the abutment surface.

5. The connection device as claimed in claim 1, wherein the annular gripper means is slidingly guided in the recess by means for an outer circumference on the actuating part slidingly engaging an inner surface of the recess.

6. The connection device as claimed in claim 1, wherein the bending means are regions of reduced wall thickness on the annular gripper means.

7. The connection device as claimed in claim 1, wherein an axially movable pressing element is oriented axially of the annular gripper means in the recess which, on internal pressurization of the recess, causes the pressing element to bear axially against axially facing surfaces on the clamping elements to cause an urging of the annular gripper means in a direction out of the recess to bring the pressing parts into engagement with the abutment surface and a resulting urging of the clamping elements radially inwardly into tighter clamping relation with the connection end.

8. The connection device as claimed in claim 7, wherein the pressing element is a sealing ring.

9. The connection device as claimed in claim 8, wherein the sealing element has adjacent axial ends thereof a sealing lip which is in contact with the outer surface of the connection end.

10. The connection device as claimed in claim 1, wherein the housing means is defined by a self-contained connection fitting.

11. The connection device as claimed in claim 10, wherein the connection fitting has a torque tool socket having a polygonal cross section 12. The connection device as claimed in claim 1, wherein the retaining recess is of V-like cross-section.

13. The connection device as claimed in claim 1, wherein the pressing parts are in the form of beads.

14. The connection device as claimed in claim 1, wherein circumferentially adjacent clamping elements are separated from each other by slots, said slots axially ending in the region of the bending means and extending at most up to a location adjacent the annular actuating part.

* * * * *